US008693133B1

(12) United States Patent
Lee et al.

(10) Patent No.: US 8,693,133 B1
(45) Date of Patent: Apr. 8, 2014

(54) SYSTEMS AND METHODS FOR IMPROVING SEQUENTIAL DATA RATE PERFORMANCE USING SORTED DATA ZONES FOR BUTTERFLY FORMAT

(71) Applicant: Western Digital Technologies, Inc., Irvine, CA (US)

(72) Inventors: Joe C. Lee, Fullerton, CA (US); Nicholas M. Warner, Livermore, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/766,470

(22) Filed: Feb. 13, 2013

Related U.S. Application Data

(63) Continuation-in-part of application No. 12/729,159, filed on Mar. 22, 2010.

(51) Int. Cl.
*G11B 21/02* (2006.01)

(52) U.S. Cl.
USPC .......................................................... 360/75

(58) Field of Classification Search
USPC .......................................................... 360/75
See application file for complete search history.

(56) References Cited

U.S. PATENT DOCUMENTS

| | | | |
|---|---|---|---|
| 4,769,770 A | 9/1988 | Miyadera et al. | |
| 4,992,936 A | 2/1991 | Katada et al. | |
| 5,121,480 A | 6/1992 | Bonke et al. | |
| 5,293,282 A | 3/1994 | Squires et al. | |
| 5,613,066 A | 3/1997 | Matsushima et al. | |
| 5,983,309 A | 11/1999 | Atsatt et al. | |
| 6,092,231 A | 7/2000 | Sze | |
| 6,105,104 A | 8/2000 | Guttmann et al. | |
| 6,182,250 B1 | 1/2001 | Ng et al. | |
| 6,182,550 B1 | 2/2001 | Brewington et al. | |
| 6,202,121 B1 | 3/2001 | Walsh et al. | |
| 6,240,501 B1 | 5/2001 | Hagersten | |
| 6,324,604 B1 | 11/2001 | Don et al. | |

(Continued)

FOREIGN PATENT DOCUMENTS

WO 2009/102425 8/2009

OTHER PUBLICATIONS

Rosenblum, Mendel and Ousterhout, John K. (Feb. 1992), "The Design and Implementation of a Log-Structured File System." ACM Transactions on Computer Systems, vol. 10, Issue 1, pp. 26-52.

(Continued)

*Primary Examiner* — Mark Blouin

(57) ABSTRACT

A multi-head disk drive is disclosed comprising a plurality of disk surfaces, and a head assembly comprising a plurality of heads, wherein each disk surface comprises a plurality of data zones, and each data zone having a data transfer rate different from the other zones of the respective disk surface. A controller is operable to sequentially write a sequence of data blocks to the plurality of disk surfaces in accordance with a list of head-zone combinations, each head-zone combination corresponding to one of the heads and one of the data zones of the respective disk surface. The head-zone combinations in the list are ordered from highest data transfer rate to lowest data transfer rate, and each disk surface comprises a pivot point defining a direction of writing data in the data zones from one of an outer diameter toward a middle diameter and an inner diameter toward the middle diameter.

22 Claims, 14 Drawing Sheets

(56) References Cited

U.S. PATENT DOCUMENTS

| | | |
|---|---|---|
| 6,339,811 B1 | 1/2002 | Gaertner et al. |
| 6,411,454 B1 | 6/2002 | Monroe, III |
| 6,556,365 B2 * | 4/2003 | Satoh ........................ 360/48 |
| 6,574,774 B1 | 6/2003 | Vasiliev |
| 6,636,049 B1 | 10/2003 | Lim et al. |
| 6,690,538 B1 | 2/2004 | Saito et al. |
| 6,728,054 B2 | 4/2004 | Chng et al. |
| 6,735,032 B2 * | 5/2004 | Dunn et al. ................ 360/51 |
| 6,772,274 B1 | 8/2004 | Estakhri |
| 6,829,688 B2 | 12/2004 | Grubbs et al. |
| 6,886,068 B2 | 4/2005 | Tomita |
| 6,895,468 B2 | 5/2005 | Rege et al. |
| 6,901,479 B2 | 5/2005 | Tomita |
| 6,920,455 B1 | 7/2005 | Weschler |
| 6,956,710 B2 | 10/2005 | Yun et al. |
| 6,967,810 B2 | 11/2005 | Kasiraj et al. |
| 6,980,386 B2 | 12/2005 | Wach et al. |
| 6,992,852 B1 | 1/2006 | Ying et al. |
| 7,012,771 B1 | 3/2006 | Asgari et al. |
| 7,035,961 B2 | 4/2006 | Edgar et al. |
| 7,046,471 B2 | 5/2006 | Meyer et al. |
| 7,076,391 B1 | 7/2006 | Pakzad et al. |
| 7,082,007 B2 | 7/2006 | Liu et al. |
| 7,089,355 B2 | 8/2006 | Auerbach et al. |
| 7,113,358 B2 | 9/2006 | Zayas et al. |
| 7,120,726 B2 | 10/2006 | Chen et al. |
| 7,155,448 B2 | 12/2006 | Winter |
| 7,199,981 B2 * | 4/2007 | Zabtcioglu ............. 360/266.2 |
| 7,254,671 B2 | 8/2007 | Haswell |
| 7,283,316 B2 | 10/2007 | Chiao et al. |
| 7,298,568 B2 * | 11/2007 | Ehrlich et al. ............. 360/53 |
| 7,330,323 B1 | 2/2008 | Singh et al. |
| 7,343,517 B2 | 3/2008 | Miller et al. |
| 7,408,731 B2 | 8/2008 | Uemura et al. |
| 7,412,585 B2 | 8/2008 | Uemura |
| 7,436,610 B1 | 10/2008 | Thelin |
| 7,436,614 B2 | 10/2008 | Uchida |
| 7,440,224 B2 * | 10/2008 | Ehrlich et al. ............ 360/77.08 |
| 7,486,460 B2 | 2/2009 | Tsuchinaga et al. |
| 7,490,212 B2 | 2/2009 | Kasiraj et al. |
| 7,509,471 B2 | 3/2009 | Gorobets |
| 7,516,267 B2 | 4/2009 | Coulson et al. |
| 7,529,880 B2 | 5/2009 | Chung et al. |
| 7,539,924 B1 | 5/2009 | Vasquez et al. |
| 7,603,530 B1 | 10/2009 | Liikanen et al. |
| 7,647,544 B1 | 1/2010 | Masiewicz |
| 7,669,044 B2 | 2/2010 | Fitzgerald et al. |
| 7,685,360 B1 | 3/2010 | Brunnett et al. |
| 7,840,878 B1 | 11/2010 | Tang et al. |
| 7,860,836 B1 | 12/2010 | Natanzon et al. |
| 7,885,921 B2 | 2/2011 | Mahar et al. |
| 7,900,037 B1 | 3/2011 | Fallone et al. |
| 7,982,993 B1 | 7/2011 | Tsai et al. |
| 8,006,027 B1 | 8/2011 | Stevens et al. |
| 8,031,423 B1 | 10/2011 | Tsai et al. |
| 8,116,020 B1 | 2/2012 | Lee |
| 8,179,627 B2 | 5/2012 | Chang et al. |
| 8,194,340 B1 | 6/2012 | Boyle et al. |
| 8,194,341 B1 | 6/2012 | Boyle |
| 8,341,339 B1 | 12/2012 | Boyle et al. |
| 8,443,167 B1 | 5/2013 | Fallone et al. |
| 8,560,759 B1 | 10/2013 | Boyle et al. |
| 2001/0042166 A1 | 11/2001 | Wilson et al. |
| 2003/0065872 A1 | 4/2003 | Edgar et al. |
| 2003/0220943 A1 | 11/2003 | Curran et al. |
| 2004/0019718 A1 | 1/2004 | Schauer et al. |
| 2004/0109376 A1 | 6/2004 | Lin |
| 2005/0069298 A1 | 3/2005 | Kasiraj et al. |
| 2005/0071537 A1 | 3/2005 | New et al. |
| 2005/0138265 A1 | 6/2005 | Nguyen et al. |
| 2005/0144517 A1 | 6/2005 | Zayas |
| 2005/0157416 A1 * | 7/2005 | Ehrlich et al. ................ 360/31 |
| 2006/0090030 A1 | 4/2006 | Ijdens et al. |
| 2006/0112138 A1 | 5/2006 | Fenske et al. |
| 2006/0117161 A1 | 6/2006 | Venturi |
| 2006/0181993 A1 | 8/2006 | Blacquiere et al. |
| 2007/0016721 A1 | 1/2007 | Gay |
| 2007/0067603 A1 | 3/2007 | Yamamoto et al. |
| 2007/0174582 A1 | 7/2007 | Feldman |
| 2007/0204100 A1 | 8/2007 | Shin et al. |
| 2007/0226394 A1 | 9/2007 | Noble |
| 2007/0245064 A1 | 10/2007 | Liu |
| 2007/0288686 A1 | 12/2007 | Arcedera et al. |
| 2007/0294589 A1 | 12/2007 | Jarvis et al. |
| 2008/0098195 A1 | 4/2008 | Cheon et al. |
| 2008/0104308 A1 | 5/2008 | Mo et al. |
| 2008/0183955 A1 | 7/2008 | Yang et al. |
| 2008/0195801 A1 | 8/2008 | Cheon et al. |
| 2008/0256287 A1 | 10/2008 | Lee et al. |
| 2008/0256295 A1 | 10/2008 | Lambert et al. |
| 2008/0270680 A1 | 10/2008 | Chang |
| 2008/0307192 A1 | 12/2008 | Sinclair et al. |
| 2009/0019218 A1 | 1/2009 | Sinclair et al. |
| 2009/0043985 A1 | 2/2009 | Tuuk et al. |
| 2009/0055620 A1 | 2/2009 | Feldman et al. |
| 2009/0063548 A1 | 3/2009 | Rusher et al. |
| 2009/0119353 A1 | 5/2009 | Oh et al. |
| 2009/0150599 A1 | 6/2009 | Bennett |
| 2009/0154254 A1 | 6/2009 | Wong et al. |
| 2009/0164535 A1 | 6/2009 | Gandhi et al. |
| 2009/0164696 A1 | 6/2009 | Allen et al. |
| 2009/0187732 A1 | 7/2009 | Greiner et al. |
| 2009/0193184 A1 | 7/2009 | Yu et al. |
| 2009/0198952 A1 | 8/2009 | Khmelnitsky et al. |
| 2009/0204750 A1 | 8/2009 | Estakhri et al. |
| 2009/0222643 A1 | 9/2009 | Chu |
| 2009/0240873 A1 | 9/2009 | Yu et al. |
| 2009/0271581 A1 | 10/2009 | Hinrichs, Jr. |
| 2009/0276604 A1 | 11/2009 | Baird et al. |
| 2010/0011275 A1 | 1/2010 | Yang |
| 2010/0061150 A1 | 3/2010 | Wu et al. |
| 2010/0161881 A1 | 6/2010 | Nagadomi et al. |
| 2010/0169543 A1 | 7/2010 | Edgington et al. |
| 2010/0169551 A1 | 7/2010 | Yano et al. |
| 2010/0208385 A1 | 8/2010 | Toukairin |
| 2011/0167049 A1 | 7/2011 | Ron |
| 2011/0304935 A1 | 12/2011 | Chang et al. |

OTHER PUBLICATIONS

Rosenblum, "The Design and Implementation of a Log-structured File System", EECS Department, University of California, Berkeley, Technical Report No. UCB/CSD-92-696, Jun. 1992.

Amer, et al., "Design Issues for a Shingled Write Disk System", 26th IEEE Symposium on Massive Storage Systems and Technologies: Research Track (MSST2010), May 2010, 12 pages.

Notice of Allowance dated May 24, 2013 from U.S. Appl. No. 12/729,159, 20 pages.

Definition of adjacent, Merriam-Webster Dictionary, retrieved from http://www.merriam-webster.com/dictionary/adjacent on Oct. 30, 2013 (1 page).

RE: Hard drive Inner or Outer Tracks???, Matthias99, Apr. 12, 2004, retrieved from http://forums.anandtech.com/showthread.php?p=11055300 on Oct. 29, 2013.

You Don't Know Jack about Disks, Dave Anderson, Seagate Technologies, Queue—Storage Queue, vol. 1, issue 4, Jun. 2003, pp. 20-30 (11 pages).

Notice of Allowance dated Aug. 21, 2013 from U.S. Appl. No. 12/729,159, 25 pages.

* cited by examiner

|      | Head |     |      |      |
|------|------|-----|------|------|
|      | 1    | 2   | 3    | 4    |
| Zone |      |     |      |      |
| 1    | 1000 | 800 | 1000 | 1000 |
| 2    | 980  | 784 | 980  | 980  |
| 3    | 960  | 768 | 960  | 960  |
| 4    | 940  | 752 | 940  | 940  |
| 5    | 920  | 736 | 920  | 920  |
| 6    | 900  | 720 | 900  | 900  |
| 7    | 880  | 704 | 880  | 880  |
| 8    | 860  | 688 | 860  | 860  |
| 9    | 840  | 672 | 840  | 840  |
| 10   | 820  | 656 | 820  | 820  |
| 11   | 800  | 640 | 800  | 800  |
| 12   | 780  | 624 | 780  | 780  |
| 13   | 760  | 608 | 760  | 760  |
| 14   | 740  | 592 | 740  | 740  |
| 15   | 720  | 576 | 720  | 720  |
| 16   | 700  | 560 | 700  | 700  |
| 17   | 680  | 544 | 680  | 680  |
| 18   | 660  | 528 | 660  | 660  |
| 19   | 640  | 512 | 640  | 640  |
| 20   | 620  | 496 | 620  | 620  |

| Head | Zone |
|------|------|
| 1 | 1 |
| 3 | 1 |
| 4 | 1 |
| 1 | 2 |
| 3 | 2 |
| 4 | 2 |
| 1 | 3 |
| 3 | 3 |
| 4 | 3 |
| 1 | 4 |
| 3 | 4 |
| 1 | 9 |
| 3 | 9 |
| 4 | 9 |
| 1 | 10 |
| 3 | 10 |
| 4 | 10 |
| 1 | 11 |
| 2 | 1 |
| 3 | 11 |
| 4 | 11 |
| 2 | 2 |
| 1 | 12 |
| 3 | 12 |
| 4 | 12 |
| 2 | 3 |
| 1 | 13 |

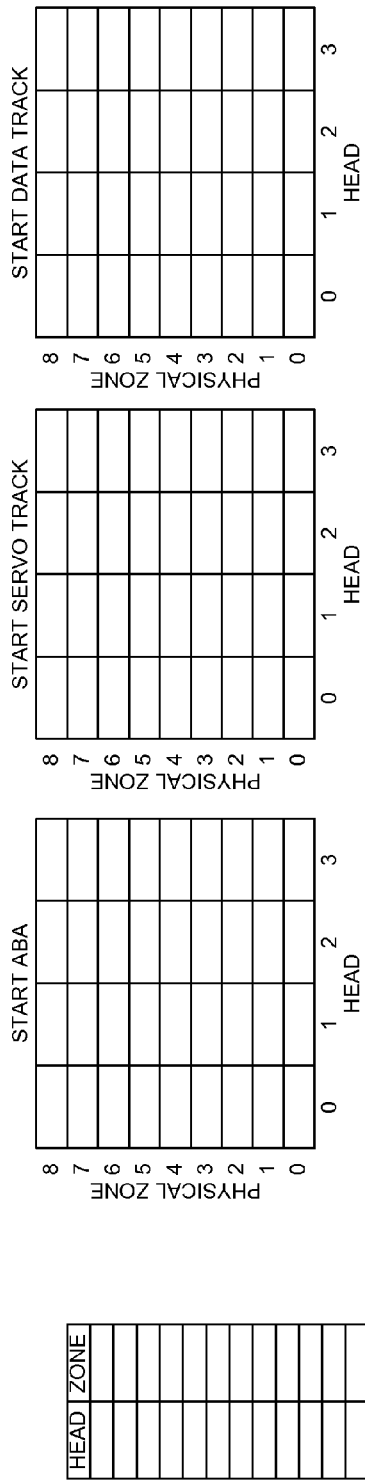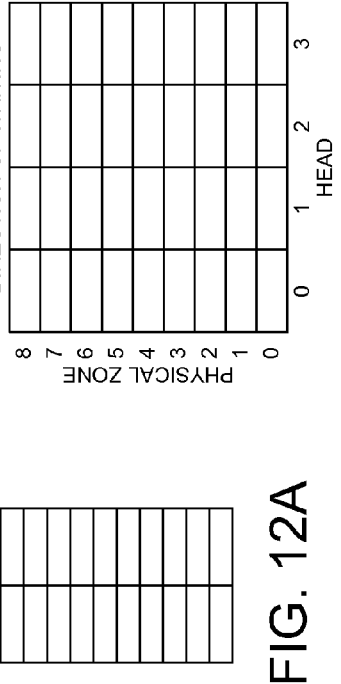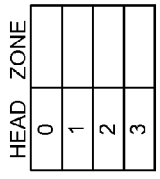

SYSTEMS AND METHODS FOR IMPROVING SEQUENTIAL DATA RATE PERFORMANCE USING SORTED DATA ZONES FOR BUTTERFLY FORMAT

CROSS REFERENCE TO RELATED APPLICATIONS

This application is a continuation-in-part of co-pending application Ser. No. 12/729,159 filed on Mar. 22, 2010, which is hereby incorporated by reference in its entirety.

BACKGROUND OF THE INVENTION

A multi-head disk drive may include multiple heads and disk surfaces, where each head is configured to write data to and read data from a respective one of the disk surfaces. Each disk surface may be formatted into a number of data zones, where each data zone is associated with a particular data transfer rate. The format may vary from disk surface to disk surface within a disk drive. This may be due to differences in performance of their respective heads and/or other factor. When a sequence of data is written to the disk drive, format variations among the disk surfaces in the disk drive may result in undesirable large fluctuations in the sequential data rate of the disk drive.

BRIEF DESCRIPTION OF THE DRAWINGS

FIG. 5 is table shown an example of zones and data rates for an example of a four-head disk drive.

FIG. 8 is an example of an ordered list of head-zone combinations ordered from highest data rate to lowest data rate.

FIGS. 12A-12G show various tables employed in the embodiments of the present invention for implementing a logical block address (LBA) to absolute block address (ABA) translation.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
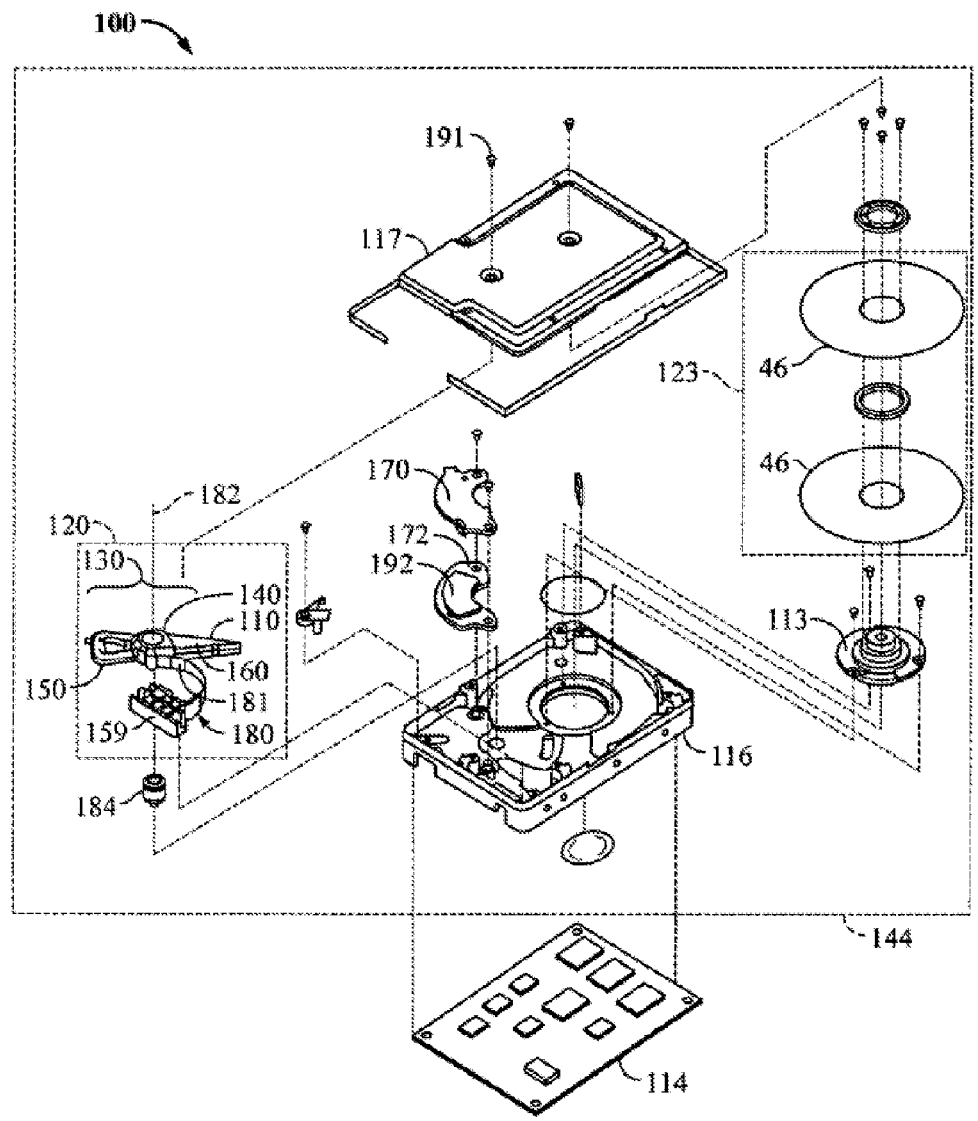
FIG. 1 is a perspective, exploded view of an example of a disk drive.

FIG. 1 is a perspective view illustrating the principal mechanical components of a disk drive 100 that may be utilized with embodiments of the invention. The disk drive 100 comprises a head disk assembly (HDA) 144 and a printed circuit board assembly (PCBA) 114. The HDA 144 includes a disk drive enclosure comprising a base 116 and a cover 117 attached to the base 116 that collectively house a disk stack 123 that includes one or a plurality of magnetic disks 46, a spindle motor 113 attached to the base 116 for rotating the disk stack 123, a head stack assembly (HSA) 120, and a pivot bearing cartridge 184 that rotatably supports the HSA 120 on the base 116. The spindle motor 113 may rotate the disk stack 123 at a relatively constant angular velocity. The HSA 120 comprises a swing-type or rotary actuator assembly 130, at least one head gimbal assembly (HGA) 110, and a flex circuit cable assembly 180. The rotary actuator assembly 130 includes a body portion 140, at least one actuator arm 160 cantilevered from the body portion 140, and a VCM coil 150 cantilevered from the body portion 140 in an opposite direction from the actuator arm 160. The actuator arm 160 supports the HGA 110 that, in turn, supports a read/write head. The flex cable assembly 180 may include a flex circuit cable and a flex clamp 159. The storage capacity of the HDA 144 may be increased by, for example, including additional disks 46 in the disk stack 123 and by the HSA 120 having a vertical stack of HGAs 110 and heads supported by multiple actuator arms 160.

The HSA 120 is pivotally secured to the base 116 via the pivot-bearing cartridge 184 so that the heads at the distal end of the HGAs 110 may be moved over the surfaces of the disks 46. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 46.

The "rotary" or "swing-type" actuator assembly comprises body portion 140 that rotates on the pivot-bearing cartridge 184 between limited positions, VCM coil 150 that extends from body portion 140 to interact with one or more permanent magnets 192 mounted to back irons 170, 172 to form the voice coil motor (VCM), and actuator arm 160 that supports HGA 110. The VCM causes the HSA 120 to pivot about the actuator pivot axis 182 to cause the heads thereof to sweep radially over the disks 46.

Figure 2:
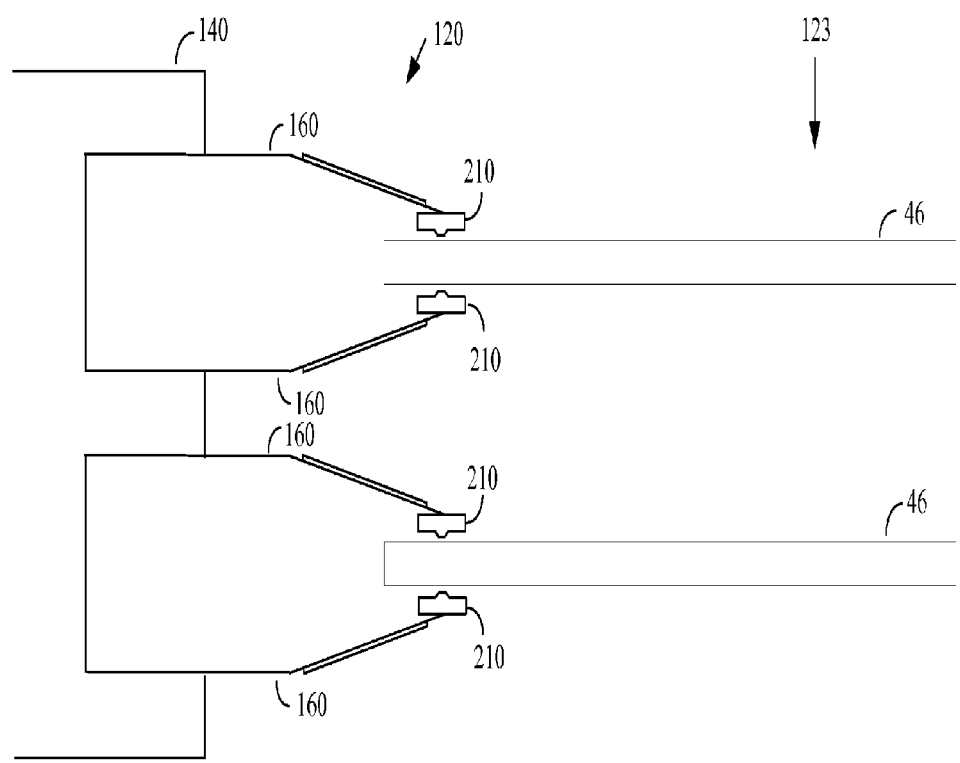
FIG. 2 is a diagram showing a side view of a head stack assembly and a disk stack for an example of a four-head disk drive.

FIG. 2 is a diagram showing a side view of the HSA 120 and the disk stack 123 for an example of a four-head disk drive 100. In this example, the HSA 120 comprises four read/write heads 210 and the disk stack 123 comprises two magnetic disks 46, where each head 210 is configured to magnetically write data to and read data from a respective surface of one of the disks 46. The HSA also comprises actuator arms 160, where each actuator arm 160 is configured to move the respective head 210 radially across the respective disk surface to position the head 210 at a desired track. The actuator arms 160 are attached to the body portion 140 of the HSA 120, which pivots about the pivot axis 182 (shown in FIG. 1). By pivoting the HSA 120, the VCM is able to move the heads 210 radially across the respective disk surfaces. Although four heads 210 are shown in FIG. 2, those skilled in the art will appreciated that the multi-head disk drive may include any number of heads.

Figure 3:
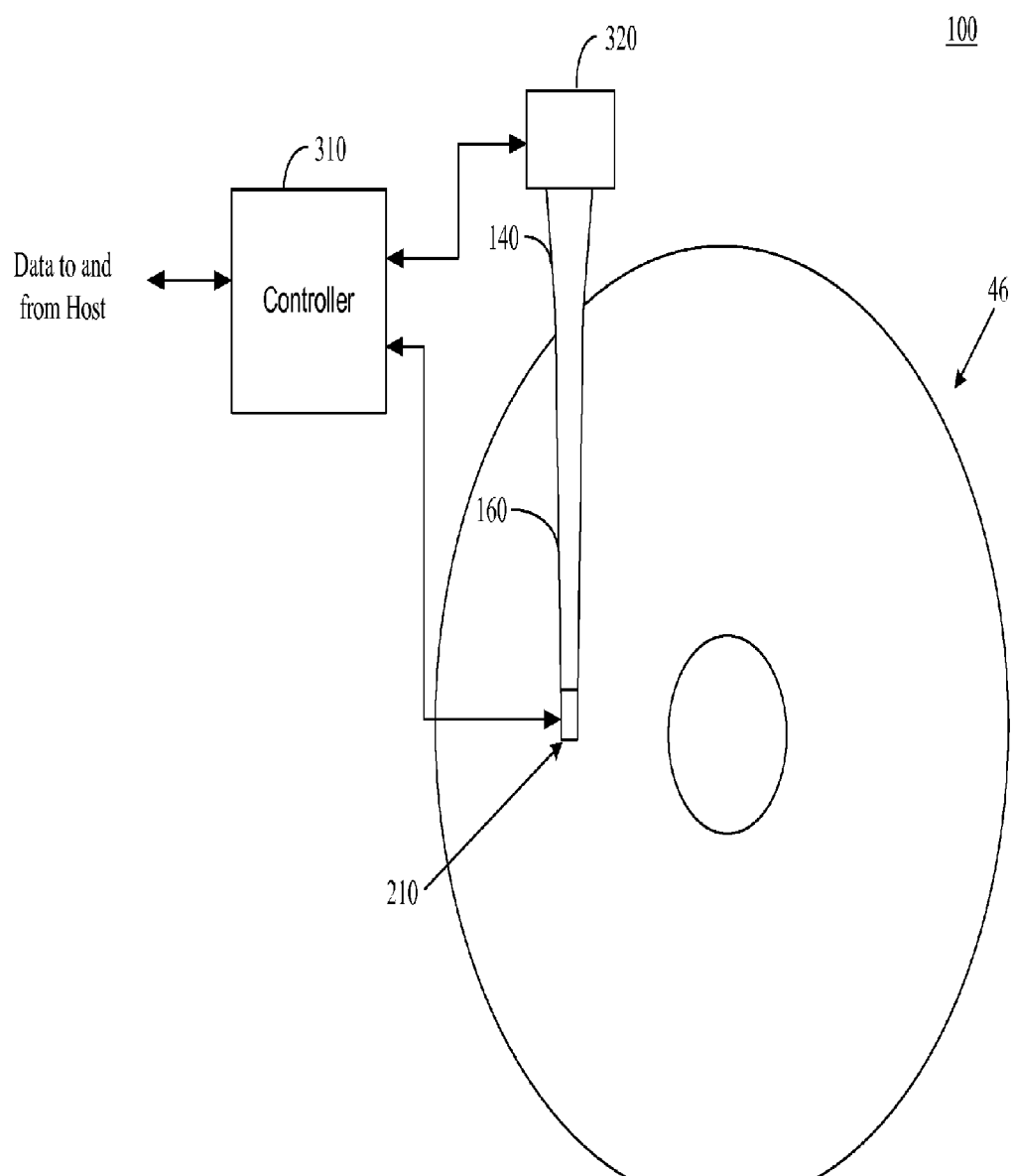
FIG. 3 is a diagram showing a disk drive.

FIG. 3 is a diagram showing the disk drive 100 according to an embodiment of the present invention. The disk drive 100 includes a controller 310 that performs various operations of the disk drive 100 described herein. The controller 310 may be located on the PCBA 114 shown in FIG. 1. The controller 310 may be implemented using one or more processors for executing instructions and may further include memory, such as a volatile or non-volatile memory, for storing data (e.g., data being processed and/or buffered), instructions, address tables, etc. The instructions may be executed by the one or more processors to perform the various functions of the controller 310 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

In one embodiment, the controller 310 transfers data between a host (not shown) and the disks 46 based on commands from the host. For example, the controller 310 may receive a write command including data to be written to the disk drive 100 from the host. The data may be logically divided into data blocks that are addressed by the host using logical block addresses (LBAs). In this example, the controller 310 may write the data to one or more disks 46 via the respective heads 210, and maintain an address table mapping the LBAs of the data blocks from the host with physical addresses of the data blocks on the disks 46. The controller 310 may also position the heads 210 at desired tracks on the disk 46 during write and/or read operations using the VCM 320.

Figure 4A:
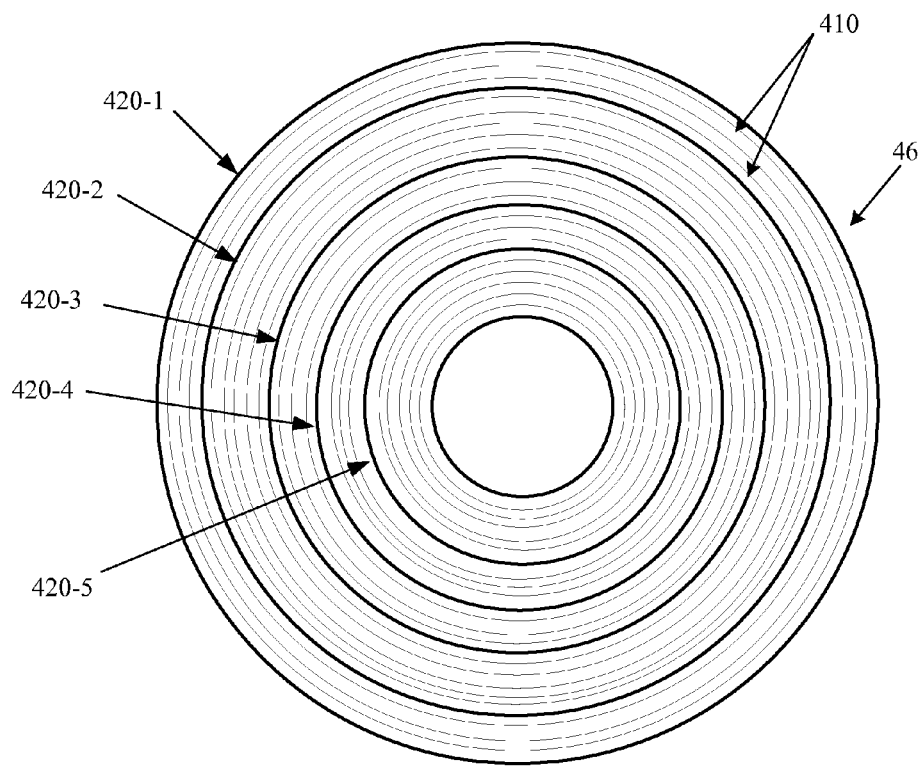
FIG. 4A shows an example of a disk surface partitioned into data zones.

Each surface of a disk 46 may be partitioned into data zones for storing data, an example of which is shown in FIG. 4A. In this example, the disk surface comprises a plurality of concentric data tracks 410, and each data zone may comprise a range the data tracks 410 on the disk surface. Each zone may be bounded by servo cylinders and/or data tracks defining an outer circumference and inner circumference of the zone.

Each data track 410 may further comprises a number of data sectors (not shown). Data tracks 410 within a particular data zone may have a similar number of sectors per track and a different number of sectors per track than tracks 410 within the other data zones. The number of sectors per track for each zone 420-1 to 420-5 may decrease moving from the outermost zone 420-1 to the innermost zone 420-5 with the outermost zone 420-1 having the largest number of sectors per track and the innermost zone 420-5 having the smallest number of sectors per tracks.

When the disk 46 is rotated at a relatively constant angular velocity, the larger number of sectors per track of the outermost zone 420-1 translates into a higher data transfer rate or data frequency than the innermost zone 420-5. In this example, the data transfer rate for each zone 420-1 to 420-5 decreases moving from the outermost zone 420-1 to the innermost zone 420-5 with the outermost zone 420-1 having the highest data rate and the innermost zone 420-5 having the lowest data rate. FIG. 4A shows an example in which the disk surface is partitioned into five data zones. Although five data zones are shown in this example for ease of illustration, those skilled in the art will appreciate that the disk surface may be partitioned into any number of data zones. Also, the number of tracks within each zone may be constant or may vary from zone to zone as shown in the example in FIG. 4A with some zones having more tracks than others.

Figure 4B:
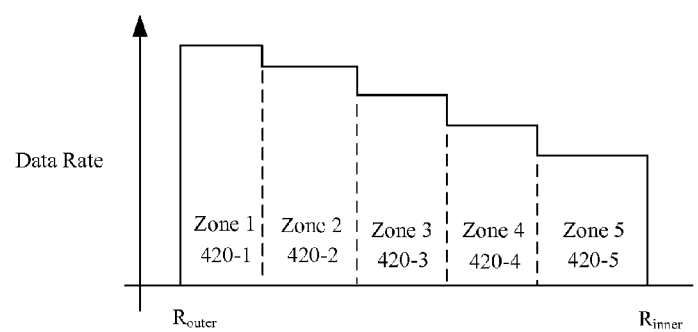
FIG. 4*b* is a plot showing an example of data rates for the different data zones shown in FIG. 4A.

FIG. 4B is a plot showing an example of data transfer rates for the different data zones 420-1 to 420-5 shown in FIG. 4A. In this example, the data transfer rate decreases in a stepwise manner moving from the outermost zone 420-1 to the innermost zone 420-5. The plot also shows the radial positions of the zones 420-1 to 420-5 on the disk surface relative to an outer radius and inner radius of the disk. In this example, the zones 420-1 to 420-5 may be indexed by zone numbers 1-5 with zone 1 corresponding to the outermost zone 420-1 and zone 5 corresponding to the innermost zone 420-5.

As discussed above, a multi-head disk drive 100 may include a head 210 for each disk surface. Each disk surface may be partitioned into a plurality of data zones, where the each data zone may have a different data transfer rate than the other data zones of the respective disk surface. In one embodiment, the data zones of a particular disk surface may have data rates within a certain data rate range with the outermost zone of the disk surface having the highest data rate within the data rate range and the innermost data zone of the disk surface having the lowest data rate within the data rate range.

Different disk surfaces in a disk drive may have different ranges of data rates for their zones. This may be due to different levels of performance of the respective heads 210. For example, a higher performing head 210 may be able to write bits that are more tightly spaced together than a lower performing head 210. In this example, the disk surface corresponding to the higher performing head 210 may be formatted with zones have higher data rates than respective zones of the disk surface corresponding to the lower performing head 210. The different performances of the heads 210 may be due to variations in manufacturing of the heads 210 or other cause.

FIG. 5 is a table showing an example of data rates for four disk surfaces and their respective heads in a multi-head disk drive. Each column in the table corresponds to a particular disk surface and respective head, and each row corresponds to a particular data zone. In this example, each disk surface has 20 data zones, in which zone 1 corresponds to the outermost zone and zone 20 corresponds to the innermost zone of the disk surface. However, one skilled in the art will appreciate that the disk surfaces may have any number of data zones. Further, one skilled in the art will appreciate that one disk surface may have a different number of data zones than another disk surface. In this example, the disk surfaces corresponding to heads 1, 3 and 4 each have a data rate range of 1000 to 620 Mbits per second for their data zones while the disk surface corresponding to head 2 has a lower data rate range of 800 to 496 Mbits per second for its data zones. This may be due to lower performance of head 2 relative to the other heads 1, 3 and 4. In this example, the zones and data rates for each disk surface may be determined empirically, for example, based on performance measurements of the respective heads.

Figure 6:
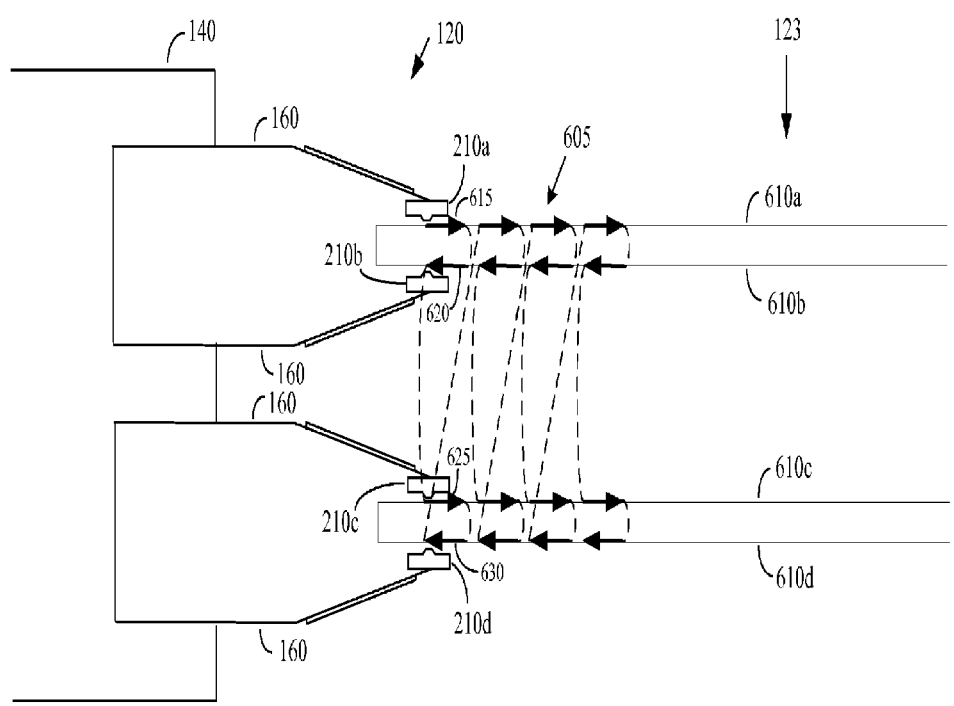
FIG. 6 shows an example of an access path having a "serpentine pattern" for a writing sequence of data to a disk drive.

A method for writing a sequence of data from the host to a multi-head disk drive will now be described with reference to FIGS. 5 and 6. In this method, the controller 310 may write a sequence of data to the disk surfaces of the disk drive by writing data to zone 1 across of all of the disk surfaces, then writing data to zone 2 across of all of the disk surfaces and so forth, an example of which is illustrated in FIG. 6. FIG. 6 shows an access path 605 along which a sequence of data may be written to the tracks of the disk surfaces 610a to 610d of the disk drive. Although the example shown in FIG. 6 has four heads, one skilled in the art will appreciate that the multi-head disk drive may include any number of heads.

In this example, the controller 310 may first write data to the tracks of zone 1 of disk surface 610a from left to right using head 210a, as indicated by arrow 615. After writing data to zone 1 of disk surface 610a, the controller 310 may switch heads to head 210b and write data to the tracks of zone 1 of disk surface 610b from right to left using head 210b, as indicated by arrow 620. After writing data to zone 1 of disk surface 610b, the controller 310 may switch heads to head 210c and write data to the tracks of zone 1 of disk surface 610c from left to right using head 210c, as indicated by arrow 625. After writing data to zone 1 of disk surface 610c, the controller 310 may switch heads to head 210d and write data to the tracks of zone 1 of disk surface 610d from right to left using head 210d, as indicated by arrow 630. After writing data to zone 1 of disk surface 610d, the controller 310 may switch heads to head 210a and begin writing data to zone 2 of the disk surfaces 610a to 610d in a similar manner as discussed above for zone 1. Head switches in the access path 605 are indicated by dashed lines in FIG. 6. Thus, the controller 310 writes to zone 1 across all heads 210a-210d, then to zone 2 across all heads 210a-210d, and so forth. The above process of sequentially writing a sequence of data to the disk surfaces 610a to 610b results in the access path 605 having the pattern shown in FIG. 6, which may be referred to as a "serpentine" pattern. Although FIG. 6 shows the access path 605 for the first four zones, those skilled in the art will appreciate that the access path 605 may continue for additional zones.

Figure 7:
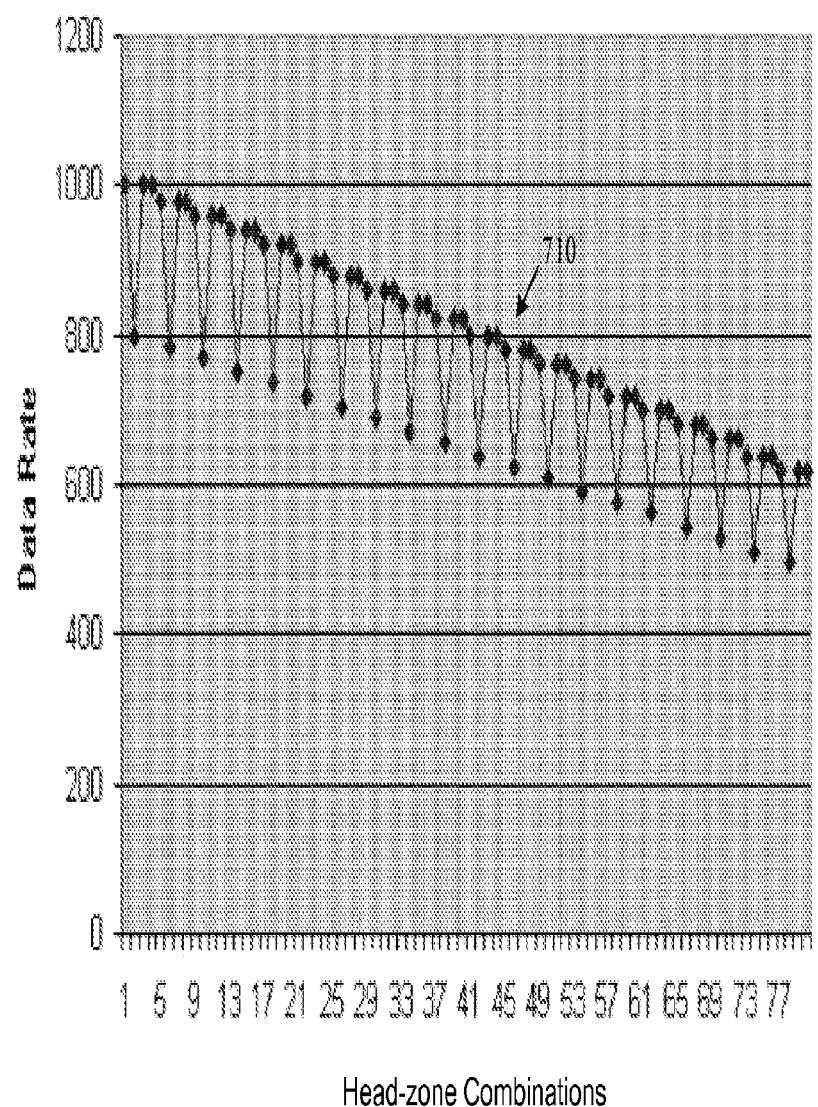
FIG. 7 is a plot showing an example of a data rate curve in accordance with the access path in FIG. 6.

FIG. 7 shows a plot of the data transfer rate for a sequence of data written to the disk drive in accordance with the access path 605 shown in FIG. 6 and the data rates shown in the example in FIG. 5. The sequence of data may comprise a sequence of data blocks logically addressed by a sequence of LBAs, where the LBAs increase from left to right in FIG. 7. In FIG. 7, data rate is plotted on the vertical axis in Mbits per second and head-zone combinations are plotted on the horizontal axis, where head-zone combinations 1-4 correspond to zone 1 across heads 1-4, head-zone combinations 5-8 correspond to zone 2 across heads 1-4, and so forth.

As shown in FIG. 7, each time data is written to the disk surface corresponding to head 2 (head 210b in FIG. 6), the sequential data rate drops sharply then rises sharply back up resulting in a data rate curve 710 characterized by downward spikes. This is because the zones of head 2 have lower data rates compared with the respective zones of heads 1, 3 and 4. As a result, the data rate curve 710 exhibits undesirable large fluctuations in data rate performance. In addition, the data rate curve 710 can vary from drive to drive, for example, depending on the relative performances of the heads of each drive.

A method for sorting data zones according to an embodiment of the present invention will now be described with reference to FIGS. 5 and 8. In one embodiment, it may be assumed that each disk surface of a disk drive has been formatted into a plurality of data zones with a data rate assigned to each zone. As discussed above, the zones and data rates for each disk surface may be determined empirically based on performance measurements of the respective head or other method. For example, there may be a predetermined set of disk surface formats, where each disk surface format specifies a number of zones, and the physical boundaries and data rate for each zone. In this example, one of the disk surface formats may be selected for a particular disk surface of a disk drive based, for example, on performance measurements of the respective head.

The zones of each disk surface may be paired with the respective head to form head-zone combinations. Each head-zone combination corresponds to one of the heads of the disk drive and a zone of the respective disk surface. For purposes of discussion, each head-zone combination may be designated by (head number, zone number).

In an embodiment, the controller 310 determines the data rate for each head-zone combination in the disk drive. For example, in the example shown in FIG. 5, there are 80 head-zone combinations.

The controller 310 may then order the head-zone combinations from the head-combination with the highest data rate to the head-zone combination with the lowest data rate. FIG. 8 shows an example of an ordered list 810, in which the head-zone combinations in FIG. 5 are ordered from highest data rate to lowest data rate. For head-zone combinations with the same data rate, the controller 310 may order these head-zone combinations consecutively based on a predetermined order of the heads or other method. In the example in FIG. 8, head-zone combinations (1, 1), (3, 1) and (4, 1), which have the same data rate of 1000 Mbits per second, may be ordered consecutively from head 1 to head 4. The ordered list 810 may be stored on one or more disks 46 and/or memory (e.g., DRAM, Flash, etc.) in the controller 310. Once stored in the drive, the ordered list 810 may be used to write a sequence of data to the disks 46, as discussed further below.

As a result of ordering the head-zone combinations from highest data rate to lowest data rate, the zones for lower performing head 2 in this example are sorted down the list 810. As shown in the example in FIG. 8, the head-zone combination (2, 1) for zone 1 of head 2 is sorted down the list 810 to entry 855 with the head-zone combinations (1, 11), (3, 11) and (4, 11) for zone 11 of heads 1, 3 and 4. This is because the data rate for head-zone combination (2, 1) is equivalent to the data rate for head-zone combinations (1, 11), (3, 11) and (4, 11) in this example. Thus, the data zone sorting according to embodiments of the present invention take into account the relative performance of each head in the disk drive by sorting the zones of lower performing heads down the ordered list.

A method for writing a sequence of data to a multi-head disk drive based on sorted zones will now be described with reference to FIGS. 9, 10A and 10B. The method may be performed by the controller 310. In one embodiment, the controller 310 may write a sequence of data to the disks 46 of the disk drive in accordance with an ordered list of head-zone combinations ordered from highest data rate to lowest data rate. For example, the controller 310 may sequentially progress through the ordered list of head-zone combinations in descending order, where, for each head-zone combination, the controller 310 may write a portion of the sequence of data to the corresponding data zone using the corresponding head.

Figure 8:
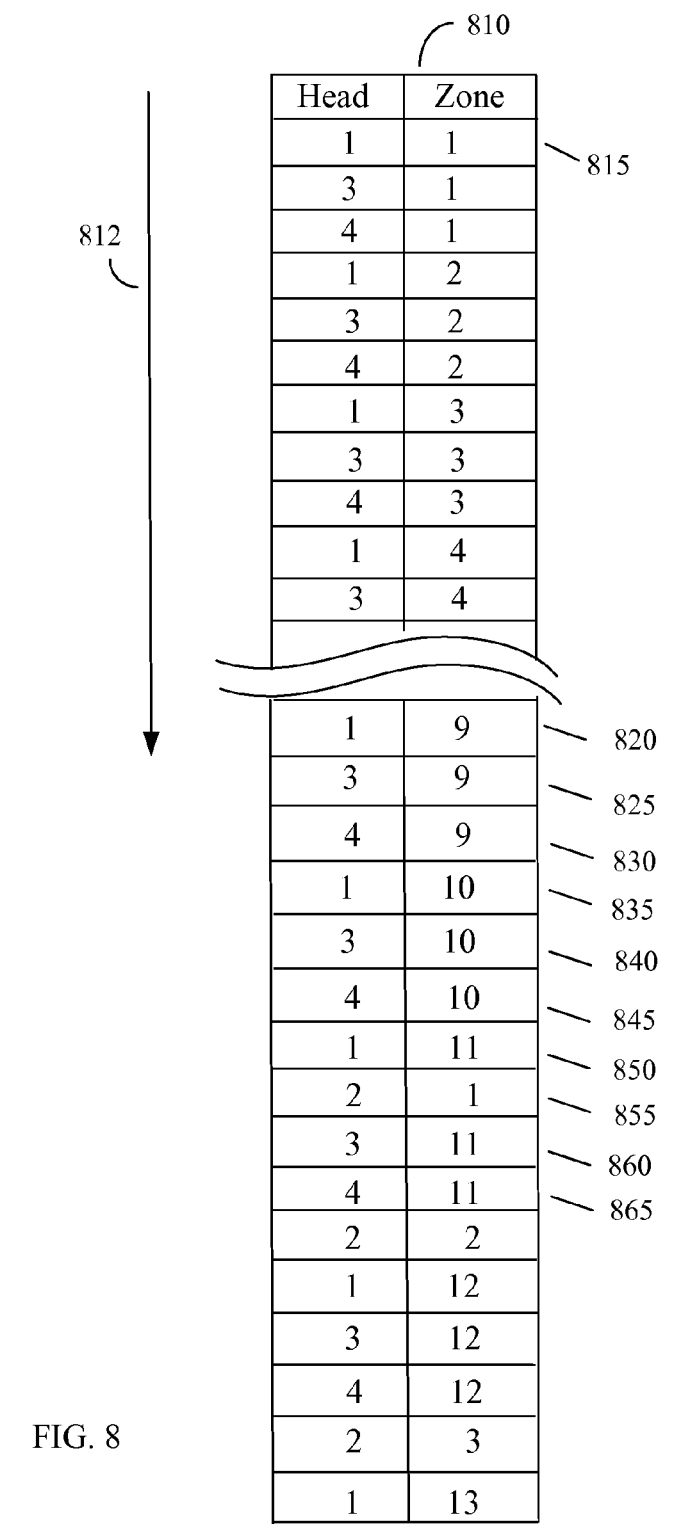

For the example in FIG. 8, the controller 310 may write a sequence of data to the disks 46 by sequentially progressing through the ordered list 810 in descending order. In this example, the controller 310 may start with head-zone combination (1, 1) in the list 810 and write a portion of the sequence of data to zone 1 of head 1. After writing to zone 1 of head 1, the controller 310 may move down the list 810 to head-zone combination (3, 1) and write a next portion of the sequence of data to zone 1 of head 3. After writing to zone 1 of head 3, the controller 310 may move down the list 810 to head-zone combination (4, 1) and write a next portion of the sequence of data to zone 1 of head 4. After writing to zone 1 of head 4, the controller 310 may move down the list to head-zone combination (1, 2), which corresponds to the next-highest data rate in the drive. The controller 310 may continue down the list 810 to write subsequent portions of the sequence of data to the disks 46. The arrow 812 in FIG. 8 indicates the descending order in which the head-zone combinations in the ordered list 810 are sequentially accessed to write the sequence of data.

In one embodiment, the sequence of data may comprise a sequence of data blocks that are locally addressed by a sequence of LBAs. The sequence of LBAs may start at LBA 0 or other LBA number, where the LBA number is incremented for each data block in the sequence of data. As data is written to the disks 46, the controller 310 may update an address table mapping the LBAs of the data blocks to physical addresses (e.g., physical block addresses) of the data blocks on the disks 46. It is to be appreciated that other addressing schemes may be used for the sequence of data. For example, the sequence of data may comprise a sequence of data blocks that are dynamically assigned logical addresses instead of a sequence of logical addresses. FIG. 9 shows a plot of the data transfer rate for a sequence of data written to the disk drive by progressing down the ordered list 810 in FIG. 8. The sequence of data may comprise a sequence of data blocks corresponding to a sequence of LBAs that increase from left to right in FIG. 9. In FIG. 9, data rate is plotted on the vertical axis in Mbits per second and head-zone combinations are plotted on the horizontal axis. The head-zone combinations along the horizontal axis are ordered in accordance with the ordered list 810, with head-zone combination 1 in FIG. 9 corresponding to the top of the ordered list 810.

Figure 9:
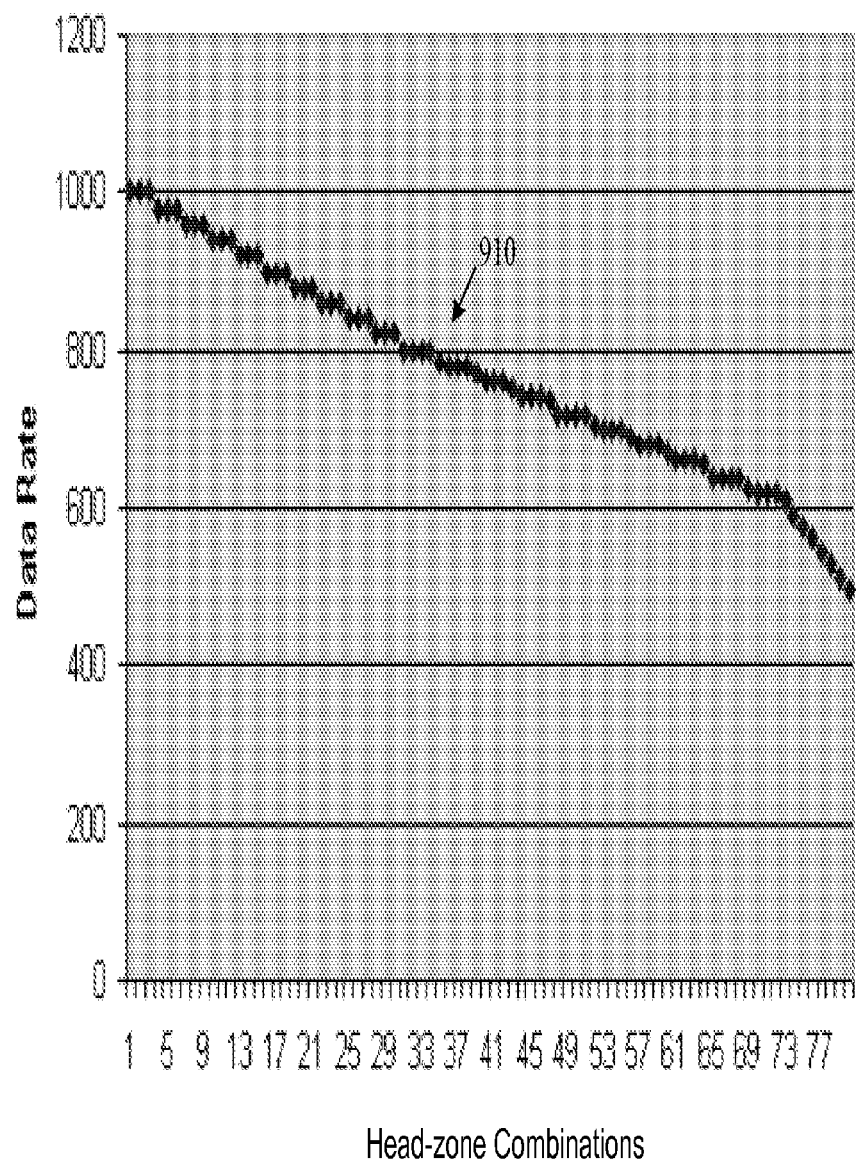
FIG. 9 is a plot showing an example of a data rate curve obtained by sequentially progressing through the ordered list in FIG. 8 in descending order.

As shown in FIG. 9, the sequential data transfer rate monotonically decreases resulting in a smooth data rate curve 910 compared with the data rate curve 710 in FIG. 7. This is because the head-zone combinations associated with lower performing head 2 are sorted down the ordered list 810. As a result, head 2 is not used until the sequential data rate decreases to the highest data rate associated with head 2. The data zone sorting according to embodiments of the invention ensures that the sequential data rate for a sequence of data written to a drive consistently moves from high data rate to low data rate.

Figure 10A:
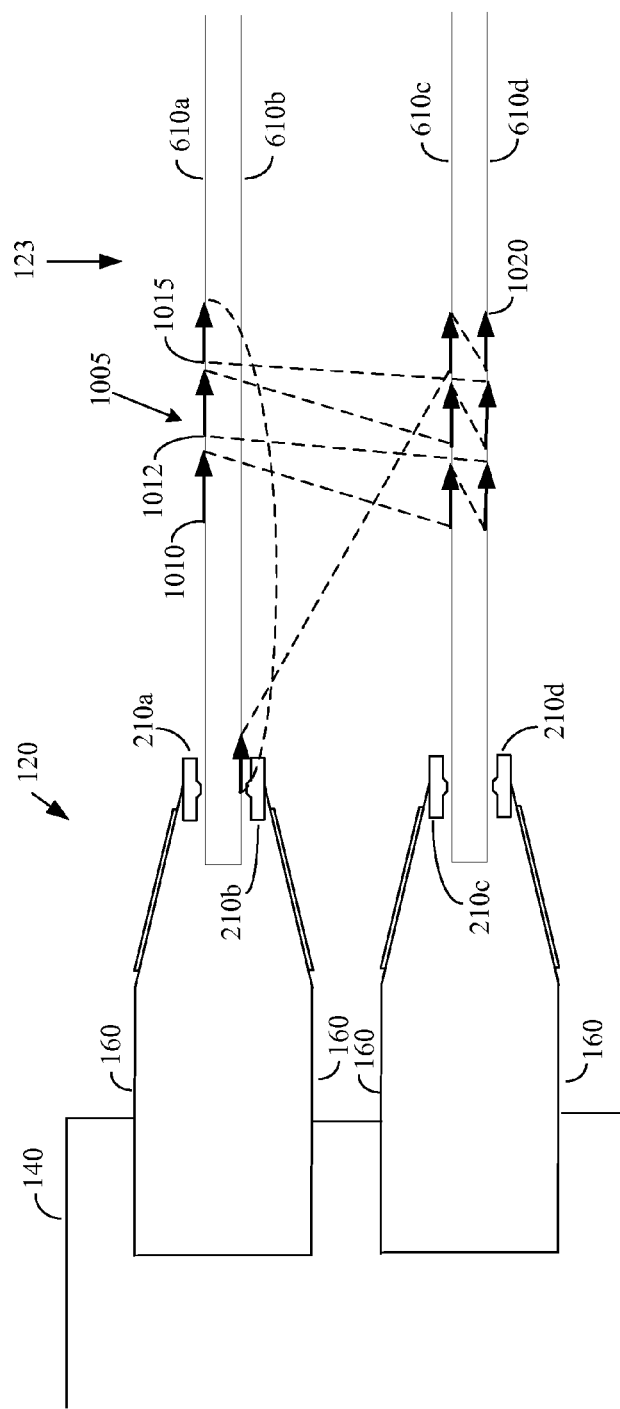
FIG. 10A shows an example of an access path for writing a sequence of data to a disk drive in accordance with the ordered list in FIG. 8.
Figure 10B:
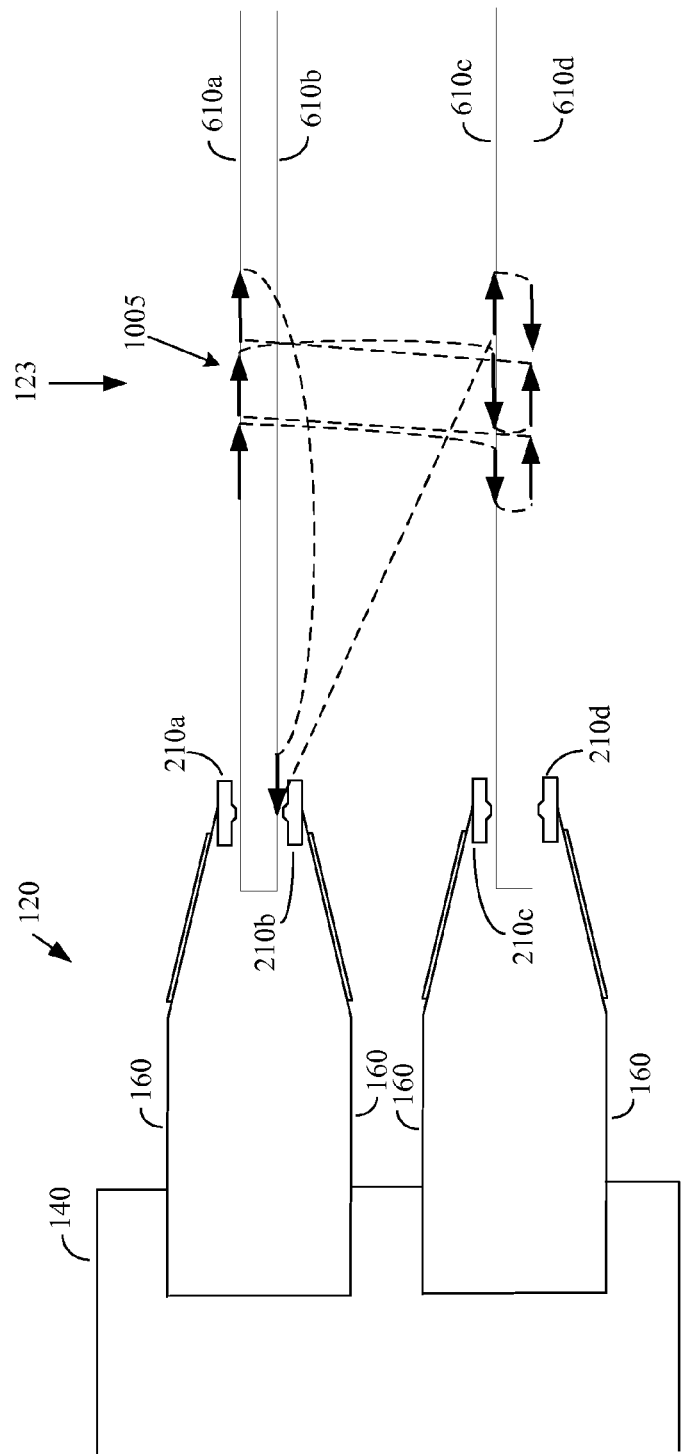
FIG. 10B shows another example of an access path for writing a sequence of data to a disk drive in accordance with the ordered list in FIG. 8.

FIG. 10A illustrates an example of an access path 1005 along which a sequence of data may be written to the tracks of the disk surfaces 610a to 610d of the disk drive. In this example, the access path 1005 is defined by sequentially progressing through the head-zone combinations in the ordered list 810 in descending order. FIG. 10A shows a portion of the access path 1005 corresponding to the head-zone combinations in entries 820 through 865 of the ordered list 810 in FIG. 8. The portion of the access path 1005 shown in FIG. 10A starts a point 1010 and ends at point 1020. In this example, heads 210a-210d in FIG. 10 correspond to heads 1-4 in the ordered list 810, respectively. In the discussion below, the corresponding heads in list 810 are in parenthesis.

At point 1010, the controller 310 writes data to zone 9 of disk surface 610a corresponding to head 210a (head 1). After writing to zone 9 of disk surface 610a, the controller 310 switches heads to head 210c (head 3) and writes data to zone 9 of disk surface 610c. After writing to zone 9 of disk surface 610c, the controller 310 switches heads to head 210d (head 4) and writes data to zone 9 of the disk surface 610d. After writing to zone 9 of disk surface 610d, the controller 310 switches heads to head 210a (head 1) and writes to zone 10 of the disk surface 610a at point 1012 of the access path 1005. The portion of the access path 1005 between points 1010 and 1012 correspond to the head-zone combinations in entries 820-835 of the ordered list 810. In this example, the controller 310 skips writing data to the disk surface 610b corresponding to head 210b (head 2) because the head-zone combinations associated with head 210b (head 2) are sorted farther down the list 810.

At point 1015, the controller 310 writes to zone 11 of the disk surface 610a corresponding to head 210a (head 1). After writing to zone 11 of disk surface 610a, the controller 310 switches heads to head 210b (head 2) and writes data to zone 1 of the disk surface 610b corresponding to head 210b (head 2). After writing to zone 1 of disk surface 610b, the controller 310 switches heads to head 210c (head 3) and writes data to zone 11 of the disk surface 610c corresponding to head 210c (head 3). After writing to zone 11 of disk surface 610c, the controller 310 switches heads to head 210d (head 4) and writes to zone 11 of the disk surface 610d corresponding to head 210d (head 4) at point 1020. The portion of the access path 1005 between points 1015 and 1020 correspond to head-zone combinations in entries 850-865 of the ordered list 810. In this example, the controller 310 begins writing data to disk surface 610b because the data rate for zone 1 of head 210b (head 2) is equivalent to the data rate for zone 11 of heads 210a, 210c and 210d (heads 1, 3 and 4).

In the example in FIG. 10A, the controller 310 writes data to the tracks of each zone from left to right, as indicated by the arrows in FIG. 10A. However, it is to be appreciated that the controller 310 may write to the tracks of each zone in any direction. For example, FIG. 10B shows an example of the access path 1005 where the controller 310 switches the direction in which data is written to the tracks between head switches, as indicated by the arrows in FIG. 10B. Head switches are indicated by dashed lines in FIGS. 10A and 10B. After each head switch to a particular head, the controller 310 may perform a track seek to position the head at a boundary of a desired zone of the respective disk surface and begin writing data to the desired zone. The controller 310 may position the head at an outer or inner boundary of the zone depending on the direction in which data is written to the tracks of the zone. For example, the head may be positioned at an outer boundary of the zone when data is written to the tracks of the zone from left to right. The controller 310 may also perform track seeks between tracks within a zone. Thus, the controller 310 may perform a sequence of head switches and track seeks of the head stack assembly 120 to write a sequence of data to the tracks of the disk surfaces 610a-610d along the access path 1005.

Figure 11A:
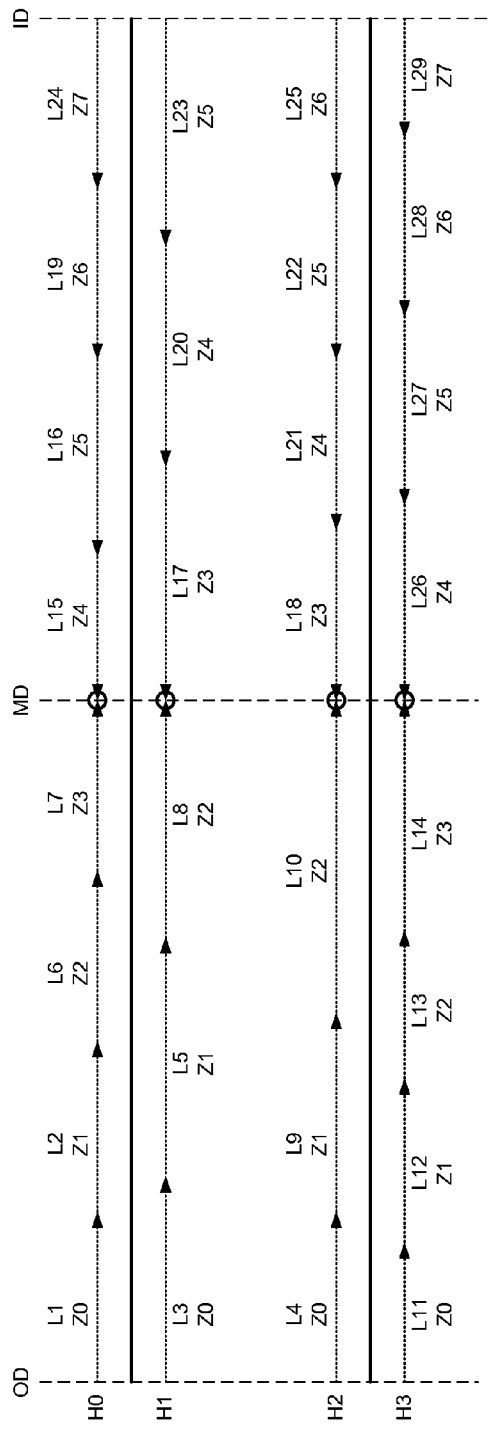
FIG. 11A shows an embodiment of the present invention wherein the disk surfaces are accessed according to a butterfly format wherein the data is written from the outer diameter toward an inner diameter pivot point, and written from the inner diameter toward the pivot point.

FIG. 11A shows an embodiment of the present invention wherein each disk surface is accessed according to a butterfly format. Each disk surface comprises a pivot point (at the middle diameter (MD) in this example) defining a direction of writing data in the zones from one of an outer diameter (OD) toward a middle diameter (MD) and from an inner diameter (ID) toward the middle diameter (MD). In other embodiments, the pivot point of each disk surface may be defined at a radial location other than at the MD, and in one embodiment the pivot point may be defined at a zero skew angle for each head which may be determined in any suitable manner. In one embodiment, the pivot point may be defined at the boundary of the zone closest to the zero skew angle point for each head.

In another embodiment, the pivot point of a disk surface may be defined within a zone, such as at a servo track within the zone that corresponds to the zero skew angle for each head.

In the embodiment of FIG. 11A, each disk surface comprises a plurality of physical zones Z0-ZN wherein a sequence of logical zones (L0-L29) are assigned to the physical zones from highest data transfer rate to lowest data transfer rate. For example, L1 is assigned to Z0 of head 0 (H0), L2 is assigned to Z1 of H1, L3 is assigned to Z0 of H1, and so on. This mapping of logical to physical zones is represented by the ordered list of head-zone combinations shown in FIG. 11B which corresponds to the logical to physical zone mapping shown in FIG. 11A. The first entry of the list in FIG. 11B corresponds to L1, the second entry corresponds to L2, and so on.

In the embodiment of FIG. 11A, each disk surface comprises a plurality of servo tracks defined by servo sectors, wherein a plurality of data tracks are defined relative to the servo tracks (at the same or different radial density). The servo tracks and data tracks are numbered from low to high from the OD to the ID of each disk surface. Each data track comprises a plurality of data blocks (data sectors), where each data sector is accessed through an absolute block address (ABA). In order to facilitate the format of logical to physical zone mapping in FIG. 11A, the ABAs are accessed indirectly through a media logical block address (LBA). The host LBAs are mapped to the media LBAs to facilitate defect mapping of defective data sectors. When a host LBA is received in an access command, the corresponding ABA is determined through the media LBA, and then the physical location of the ABA is determined (disk surface, data track, and data sector within the data track).

FIGS. 12A-12G illustrate embodiments of the present invention wherein various parameters are associated with each head-zone combination, wherein the parameters are used to implement the host LBA to ABA translation based on the format defined by the ordered list shown in FIG. 12A. In an embodiment shown in FIG. 12B, a starting ABA is associated with each head-zone combination, in FIG. 12C a starting servo track is associated with each head-zone combination, and in FIG. 12D a starting data track is associated with each head-zone combination. Referring to the flow diagram of FIG. 13, when an access command is received from the host comprising a host LBA (block 1302), the host LBA is mapped to a corresponding media LBA (block 1304), and the media LBA is mapped to a corresponding ABA (block 1306) in order to determine the target ABA that corresponds to the host LBA.

Figure 11C:
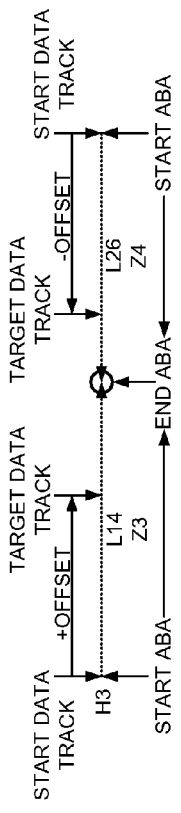
FIG. 11C illustrates an example wherein an offset is either added or subtracted from a starting data track of a zone depending on the direction of writing in order to determine the radial location of a target data track of an access operation.
Figure 11B:
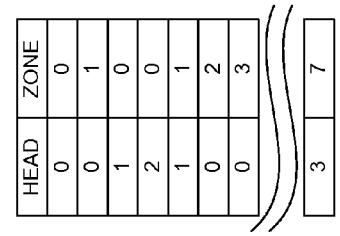
FIG. 11B is an example of an ordered list of head-zone combinations ordered from highest data rate to lowest data rate corresponding to the logical to physical zone mapping shown in FIG. 11A.

The table shown in FIG. 12B is sorted into an ordered sequence of starting ABAs so that a binary search can be performed to find the starting ABA that corresponds to the target ABA (block 1308), wherein the starting ABA corresponds to a particular head-zone combination as shown in FIG. 12B. Once the head-zone combination has been determined, the direction of writing (OD toward MD or ID toward MD) for the head-zone combination is determined (block 1310) using any suitable technique, examples of which are described below. After determining the head-zone combination for the target ABA (such as a head-zone shown in FIG. 11A), the corresponding data track within the head-zone combination is determined. In one embodiment, this is implemented by adding or subtracting an offset to the starting data track of the head-zone combination (FIG. 12D). The offset is determined relative to a difference between the target ABA and the starting ABA for the head-zone combination, wherein this difference is integer divided by the number of data sectors per track (the remainder of the division represents the target data sector within the target data track). Referring to FIG. 11C, the offset is added to the start data track if writing from the OD toward the MD, and the offset is subtracted from the starting data track if writing from the ID toward the MD.

In one embodiment, an additional table (not shown) is generated for the head-zone combinations that border the pivot point, wherein each entry identifies the end ABA for the head-zone combination. In the example shown in FIG. 11A, the table stores the end ABA for the head-zone combinations corresponding to L7, L8, L10, L14, L15, L17, L18 and L26. This table is then used to map the target ABA of a host access command to the correct head-zone combination. Referring to the example of FIG. 11C, if the binary search of the start ABA table (FIG. 12B) returns (3, 4) as the head-zone combination, the end ABA for the (3, 4) combination is evaluated to determine whether the target ABA maps to the (3, 4) combination or to the (3, 3) combination. Once the target data track within the target head-zone combination is located (block 1312), the target data sector is located within the target data track as the remainder of the division described above (block 1314), and the access command is executed (block 1316).

Figure 13:
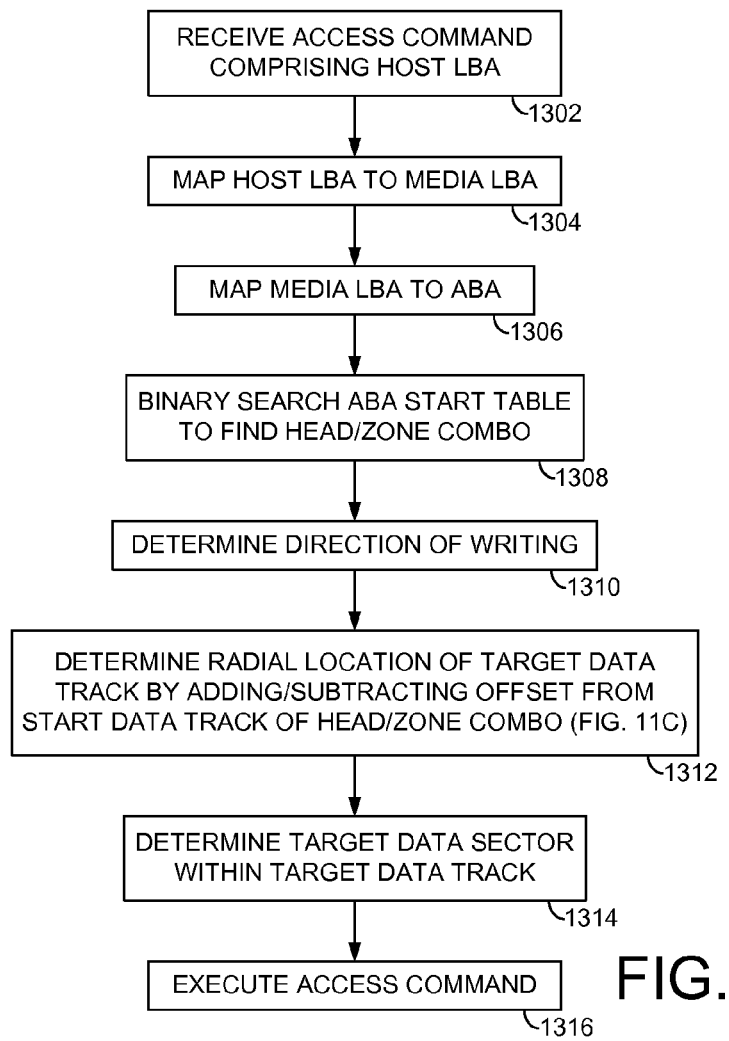
FIG. 13 is a flow diagram according to an embodiment of the present invention for mapping a host LBA to an ABA using the tables in FIGS. 12A-12G, including to determine the direction of writing.

In one embodiment, the controller 310 is operable to determine the direction of writing for a particular zone at block 1310 of FIG. 13 using any suitable technique. In one embodiment shown in FIG. 12E, a head-zone combination table is generated, wherein each entry of the table stores a "0" if the direction of writing is from the OD toward MD, and stores a "1" if the direction of writing is from the ID toward MD. Accordingly, once the target head-zone combination is determined at block 1308, the controller 310 may evaluate the table of FIG. 12E to determine the direction of writing. In another embodiment, a table is generated (FIG. 12F) wherein the servo track corresponding to the pivot point for each head is stored. Once the target head-zone combination is determined at block 1308, the controller 310 may evaluate the table of FIG. 12C to determine the direction of writing by comparing the starting servo track of the target head-zone combination to the pivot point servo track stored in FIG. 12F. In yet another embodiment, a table is generated (FIG. 12G) wherein the zone corresponding to the pivot point for each head is stored. The controller 310 may determine the direction of writing by comparing the zone in the target head-zone combination determined at block 1308 to the zones in the table of FIG. 12G. This embodiment assumes that the pivot point is defined at the boundary of a zone.

Figure 14:
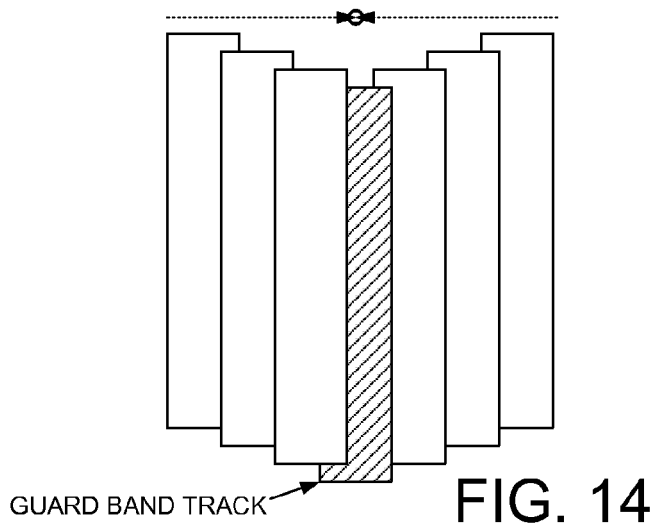
FIG. 14 shows an embodiment of the present invention wherein the data tracks are written in an overlapping (shingled) manner in order to increase the radial density of the data tracks.

FIG. 14 illustrates an embodiment of the present invention wherein the data tracks are written in an overlapping (shingled) manner in order to increase the radial density of the data tracks. That is, part of a previously written data track is overwritten by the next data track such that the next data track partially overlaps the previously written data track as illustrated in FIG. 14. In one embodiment, a guard band is defined at the pivot point, wherein the guard band comprises one or more of the data tracks. The data tracks in the guard band are mapped out of the format of the disk surfaces (i.e., ABAs are not assigned to these data tracks) since these data tracks may be substantially overwritten due to the butterfly writing of the disk surfaces.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A multi-head disk drive comprising:
one or more disks having a plurality of disk surfaces, wherein each disk surface comprises a plurality of data zones, each data zone having a data transfer rate different from the other zones of the respective disk surface;
a head assembly comprising a plurality of heads, wherein each head is operable to write data to a respective one of the disk surfaces; and
a controller operable to sequentially write a sequence of data blocks to the plurality of disk surfaces in accordance with a list of head-zone combinations, each head-zone combination corresponding to one of the heads and one of the data zones of the respective disk surface, wherein:
the head-zone combinations in the list are ordered from highest data transfer rate to lowest data transfer rate; and
each disk surface comprises a pivot point defining a direction of writing data in the data zones from one of an outer diameter toward a middle diameter and an inner diameter toward the middle diameter.

2. The disk drive of claim 1, wherein each head-zone combination in the list comprises an indicator indicating the direction of writing in the corresponding data zone.

3. The disk drive of claim 2, wherein:
each disk surface comprises a plurality of tracks;
the pivot point is defined relative to one of the tracks; and
the indicator indicating the direction of writing of the data zone comprises one of the tracks that defines a starting track of the data zone.

4. The disk drive of claim 2, wherein:
each disk surface comprises a plurality of servo tracks and a plurality of data tracks defined relative to the servo tracks;
each data track comprises a plurality of data sectors, wherein each data sector is accessed through an absolute block address (ABA);
the pivot point is defined relative to one of the servo tracks; and
the indicator indicating the direction of writing of the data zone comprises one of the servo tracks that defines a starting servo track of the data zone.

5. The disk drive of claim 2, wherein each head-zone combination in the list comprises one of the data tracks that defines a starting data track of the data zone.

6. The disk drive of claim 2, wherein each head-zone combination in the list comprises an absolute block address (ABA) identifying a starting ABA for the corresponding data zone.

7. The disk drive of claim 6, wherein the controller is further operable to:
map host logical bock addresses (LBAs) to media LBAs; and
map the media LBAs to the ABAs, wherein a sequence of the media LBAs does not match a sequence of the ABAs.

8. The disk drive of claim 7, wherein the media LBAs are assigned to the data zones such that the sequence of the media LBAs correlates with the highest data transfer rate data zone to the lowest data transfer rate data zone.

9. The disk drive of claim 8, wherein the media LBAs are assigned to the data zones such that the lowest address of the media LBAs is assigned to the highest data transfer rate data zone and the highest address of the media LBAs is assigned to the lowest data transfer rate data zone.

10. The disk drive of claim 9, wherein the controller is further operable to:
receive an access command from a host, wherein the access command comprises a target host LBA;
map the target host LBA to a target media LBA;
map the target media LBA to target ABA;
locate the head-zone combination based on the target ABA and the starting ABA of each head-zone combination;
determine the direction of writing based on the indicator;
determine a target data track and a target data sector based on the located head-zone combination and the determined direction of writing; and
execute the access command for the target data sector.

11. The disk drive of claim 1, wherein:
each disk surface comprises a plurality of servo tracks and a plurality of data tracks defined relative to the servo tracks; and
the controller is operable to write the data tracks in an overlapping manner in order to increase the radial density of the data tracks.

12. A method of operating a multi-head disk drive comprising one or more disks having a plurality of disk surfaces, wherein each disk surface comprises a plurality of data zones, each data zone having a data transfer rate different from the other zones of the respective disk surface, and a head assembly comprising a plurality of heads, wherein each head is operable to write data to a respective one of the disk surfaces, the method comprising sequentially writing a sequence of data blocks to the plurality of disk surfaces in accordance with a list of head-zone combinations, each head-zone combination corresponding to one of the heads and one of the data zones of the respective disk surface, wherein:
the head-zone combinations in the list are ordered from highest data transfer rate to lowest data transfer rate; and
each disk surface comprises a pivot point defining a direction of writing data in the data zones from one of an outer diameter toward a middle diameter and an inner diameter toward the middle diameter.

13. The method of claim 12, wherein each head-zone combination in the list comprises an indicator indicating the direction of writing in the corresponding data zone.

14. The method of claim 13, wherein:
each disk surface comprises a plurality of tracks;
the pivot point is defined relative to one of the tracks; and the indicator indicating the direction of writing of the data zone comprises one of the tracks that defines a starting track of the data zone.

15. The method of claim 13, wherein:

each disk surface comprises a plurality of servo tracks and a plurality of data tracks defined relative to the servo tracks;

each data track comprises a plurality of data sectors, wherein each data sector is accessed through an absolute block address (ABA);

the pivot point is defined relative to one of the servo tracks; and the indicator indicating the direction of writing of the data zone comprises one of the servo tracks that defines a starting servo track of the data zone.

16. The method of claim 13, wherein each head-zone combination in the list comprises one of the data tracks that defines a starting data track of the data zone.

17. The method of claim 13, wherein each head-zone combination in the list comprises an absolute block address (ABA) identifying a starting ABA for the corresponding data zone.

18. The method of claim 17, further comprising:

mapping host logical bock addresses (LBAs) to media LBAs; and mapping the media LBAs to the ABAs, wherein a sequence of the media LBAs does not match a sequence of the ABAs.

19. The method of claim 18, wherein the media LBAs are assigned to the data zones such that the sequence of the media LBAs correlates with the highest data transfer rate data zone to the lowest data transfer rate data zone.

20. The method of claim 19, wherein the media LBAs are assigned to the data zones such that the lowest address of the media LBAs is assigned to the highest data transfer rate data zone and the highest address of the media LBAs is assigned to the lowest data transfer rate data zone.

21. The method of claim 20, further comprising:

receiving an access command from a host, wherein the access command comprises a target host LBA;

mapping the target host LBA to a target media LBA;

mapping the target media LBA to target ABA;

locating the head-zone combination based on the target ABA and the starting ABA of each head-zone combination;

determining the direction of writing based on the indicator;

determining a target data track and a target data sector based on the located head-zone combination and the determined direction of writing; and executing the access command for the target data sector.

22. The method of claim 13, wherein:

each disk surface comprises a plurality of servo tracks and a plurality of data tracks defined relative to the servo tracks; and further comprising writing the data tracks in an overlapping manner in order to increase the radial density of the data tracks.

* * * * *